United States Patent
Fukami et al.

(10) Patent No.: US 11,934,986 B2
(45) Date of Patent: Mar. 19, 2024

(54) PLANT OPERATION SUPPORT APPARATUS AND PLANT OPERATION SUPPORT METHOD

(71) Applicant: Mitsubishi Electric Corporation, Tokyo (JP)

(72) Inventors: Kenta Fukami, Tokyo (JP); Mami Naruse, Tokyo (JP); Mitsunobu Yoshinaga, Tokyo (JP); Nami Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/789,553

(22) PCT Filed: Mar. 23, 2020

(86) PCT No.: PCT/JP2020/012602
§ 371 (c)(1),
(2) Date: Jun. 28, 2022

(87) PCT Pub. No.: WO2021/191941
PCT Pub. Date: Sep. 30, 2021

(65) Prior Publication Data
US 2023/0037720 A1 Feb. 9, 2023

(51) Int. Cl.
*G06Q 10/0631* (2023.01)
*G06Q 10/0639* (2023.01)

(52) U.S. Cl.
CPC .............. *G06Q 10/06393* (2013.01)

(58) Field of Classification Search
CPC ............................................ G06Q 10/06393
See application file for complete search history.

(56) References Cited

U.S. PATENT DOCUMENTS

| | | | |
|---|---|---|---|
| 9,325,591 B1* | 4/2016 | Kum | H04L 41/5009 |
| 2002/0035495 A1* | 3/2002 | Spira | G06Q 10/0637 |
| | | | 705/7.36 |

(Continued)

FOREIGN PATENT DOCUMENTS

| CN | 101119365 A | * | 2/2008 |
|---|---|---|---|
| JP | H01123304 A | | 5/1989 |

(Continued)

OTHER PUBLICATIONS

Li et al. "Systematic review of methods for quantifying teamwork in the operating theatre" (2018) (https://www.ncbi.nlm.nih.gov/pmc/articles/PMC5952378/pdf/BJS5-2-42.pdf) (Year: 2018).*

(Continued)

*Primary Examiner* — Sujay Koneru
(74) *Attorney, Agent, or Firm* — BUCHANAN INGERSOLL & ROONEY PC

(57) ABSTRACT

Provided are an index value calculator to calculate an index value obtained by quantifying a degree of status for evaluation items, a teamwork evaluator to evaluate a teamwork based on the index value, a support content determiner to select target persons to be supported including the members of the team based on the evaluation result of the teamwork and determine support contents in accordance with the target persons to be supported, and a presentation information generator to generate presentation information for presenting the determined support contents for each of the output devices corresponding to the selected target persons to be supported, and the teamwork evaluator evaluates the teamwork using an evaluation logic configured by combining logical formulas for comparing a threshold value set for evaluation items with the calculated index value.

14 Claims, 12 Drawing Sheets

(56) References Cited

U.S. PATENT DOCUMENTS

| | | | | |
|---|---|---|---|---|
| 2004/0153355 | A1* | 8/2004 | Deering | G06Q 10/06398 705/7.42 |
| 2010/0010879 | A1* | 1/2010 | Roebke | G06Q 10/06393 705/7.39 |
| 2011/0134204 | A1* | 6/2011 | Rodriguez | G06Q 10/10 704/E21.001 |
| 2011/0246340 | A1* | 10/2011 | Dahod | G06Q 10/06393 715/753 |
| 2014/0278241 | A1* | 9/2014 | Jiang | G01M 99/00 702/182 |
| 2015/0199010 | A1* | 7/2015 | Coleman | H04L 12/16 345/156 |
| 2015/0269512 | A1* | 9/2015 | Wartel | G06Q 10/06393 705/7.39 |
| 2016/0210962 | A1* | 7/2016 | Kim | G06F 40/30 |
| 2017/0024694 | A1* | 1/2017 | Dahod | G06Q 10/10 |
| 2018/0005161 | A1* | 1/2018 | Cong | G06Q 10/06398 |
| 2018/0101776 | A1* | 4/2018 | Osotio | G06F 16/258 |
| 2020/0005211 | A1 | 1/2020 | Tsuji et al. | |
| 2020/0135195 | A1 | 4/2020 | Ishikawa et al. | |
| 2020/0401977 | A1* | 12/2020 | Ren | G06Q 10/06398 |
| 2021/0150486 | A1* | 5/2021 | Ghosh | G06Q 10/06393 |
| 2021/0304107 | A1* | 9/2021 | Fink | G06Q 10/06398 |

FOREIGN PATENT DOCUMENTS

| | | |
|---|---|---|
| JP | 2003271048 A | 9/2003 |
| JP | 2008140340 A | 6/2008 |
| JP | 2011175479 A | 9/2011 |
| JP | 2016007363 A | 1/2016 |
| JP | 2018207650 A | 12/2018 |
| JP | 2019036205 A | 3/2019 |
| WO | 2019049356 A1 | 3/2019 |

OTHER PUBLICATIONS

International Search Report (PCT/ISA/210) with English translation and Written Opinion (PCT/ISA/237) dated Sep. 29, 2020, by the Japan Patent Office as the International Searching Authority for International Application No. PCT/JP2020/012602.

Office Action dated Nov. 1, 2022 issued in corresponding Japanese Patent Application 2022-509758, 8 pages including 4 pages of English Translation.

Office Action dated Nov. 17, 2023, issued in the corresponding Canadian patent Application No. 3,171,492, 5 pages.

* cited by examiner

| support name (D511) | determination condition (D512) | destination user for information presentation (D513) | presentation method (D514) | support contents (D515) |
|---|---|---|---|---|
| authority gradient: High level 1 | authority gradient: High level 1 | User-B User-C | message display on the operation screen | [Team performance is declining. Supervisor's authority is too strong]<br>Advice for improvement:<br>Don't be covered but tell what you should tell. To reduce the authority gradient, please ask the supervisor about original goals and objectives. |
| authority gradient: High level 2 | authority gradient: High level 2 | User-D | message display on the supervisor's screen | [Operation team reorganization recommended.<br>Supervisor's authority is so strong that it is difficult to continue operation in the future]<br>With the current team performance, it is expected to be difficult to carry out operation tasks in the future. Please consider increasing or replacing team members. |
| ... | ... | ... | ... | ... |

FIG. 9

PLANT OPERATION SUPPORT APPARATUS AND PLANT OPERATION SUPPORT METHOD

TECHNICAL FIELD

The present application relates to a plant operation support apparatus and a plant operation support method.

BACKGROUND ART

In recent years, a software type digital monitoring and control panel (digital panel) has been introduced in place of a conventional hardware type analog monitoring and control panel in the monitoring and control apparatus for a large-scale plant in an electric power field or the like. In the digital panel, work is performed using a graphical user interface (GUI) in which monitoring and control functions are integrated, making it possible to reduce the size of the apparatus and a load on an operator in the operation.

In general, plant operation is managed by an operating team consisting of a plurality of members that monitors and operates a central control panel of a plant monitoring and control room. In this case, for the purpose of reducing human errors of operators, an evaluation method has been proposed in which teamwork at the time of operation training is evaluated and appropriate advice is presented when a failure occurs (refer to, for example, Patent Documents 1 and 2).

CITATION LIST

Patent Document

Patent Document 1: Japanese Unexamined Patent Application Publication No. 2003-271048 (Paragraphs 0027 to 0031, FIG. 2)

Patent Document 2: Japanese Unexamined Patent Application Publication No. 2019-36205 (Paragraphs 0022 to 0023, 0049 to 0051, and FIG. 1)

SUMMARY OF INVENTION

Problems to be Solved by Invention

However, in the above-described evaluation method, since the teamwork is evaluated in comparison with past good example data serving as a model, it is necessary to prepare data to be compared in advance, and there is a problem that the criterion cannot be easily changed in accordance with a situation.

The present application discloses a technique for solving the above-mentioned problems and aims to enable evaluation of the teamwork and a support for appropriate plant operation without preparing predetermined correct data.

Means for Solving Problems

A plant operation support apparatus disclosed in the present application includes an output device to be provided in correspondence with each of a plurality of members constituting a team and to present information for performing plant operation as the team, an index value calculation unit to calculate, with respect to a plurality of evaluation items for evaluating any of status of each of the plurality of members, communication status between the members, and workload status of each of the plurality of members, an index value obtained by quantifying a degree of the status for each of the evaluation items, a teamwork evaluation unit to evaluate a teamwork of the team based on the index value, a support content determination unit to select target persons to be supported including the members of the team based on the evaluation result of the teamwork and determine support contents in accordance with the target persons to be supported, and a presentation information generation unit to generate presentation information for presenting the determined support contents for each of the output devices corresponding to the selected target persons to be supported among the output devices, wherein the teamwork evaluation unit evaluates the teamwork using an evaluation logic configured by combining logical formulas for comparing a threshold value set for each of the plurality of evaluation items with the calculated index value.

A plant operation support method includes an index value calculation step of calculating, with respect to a plurality of evaluation items for evaluating any of status of each of the plurality of members who perform plant operation as a team, communication status between the members, and workload status of each of the plurality of members, an index value obtained by quantifying a degree of the status for each of the evaluation items, a teamwork evaluation step of evaluating a teamwork of the team based on the calculated index value, a support content determination step of selecting target persons to be supported including the members of the team based on the evaluation result of the teamwork and determining support contents in accordance with the target persons to be supported, and a support content presentation step of presenting the determined support contents for each of the selected target persons to be supported, wherein in the teamwork evaluation step, the teamwork is evaluated using an evaluation logic configured by combining logical formulas for comparing a threshold value set for each of the plurality of evaluation items with the calculated index value.

Effect of Invention

According to the plant operation support apparatus or the plant operation support method disclosed in the present application, since teamwork is evaluated by using evaluation logic formed by combining logical formulas, the teamwork can be evaluated, and plant operation can be appropriately supported without preparing the predetermined correct data.

BRIEF DESCRIPTION OF DRAWINGS

FIG. 9 is a diagram showing a data structure of a support content determination table included in a support content determination unit in the plant operation support apparatus according to Embodiment 1.

MODES FOR CARRYING OUT INVENTION

Embodiment 1

Figure 1:
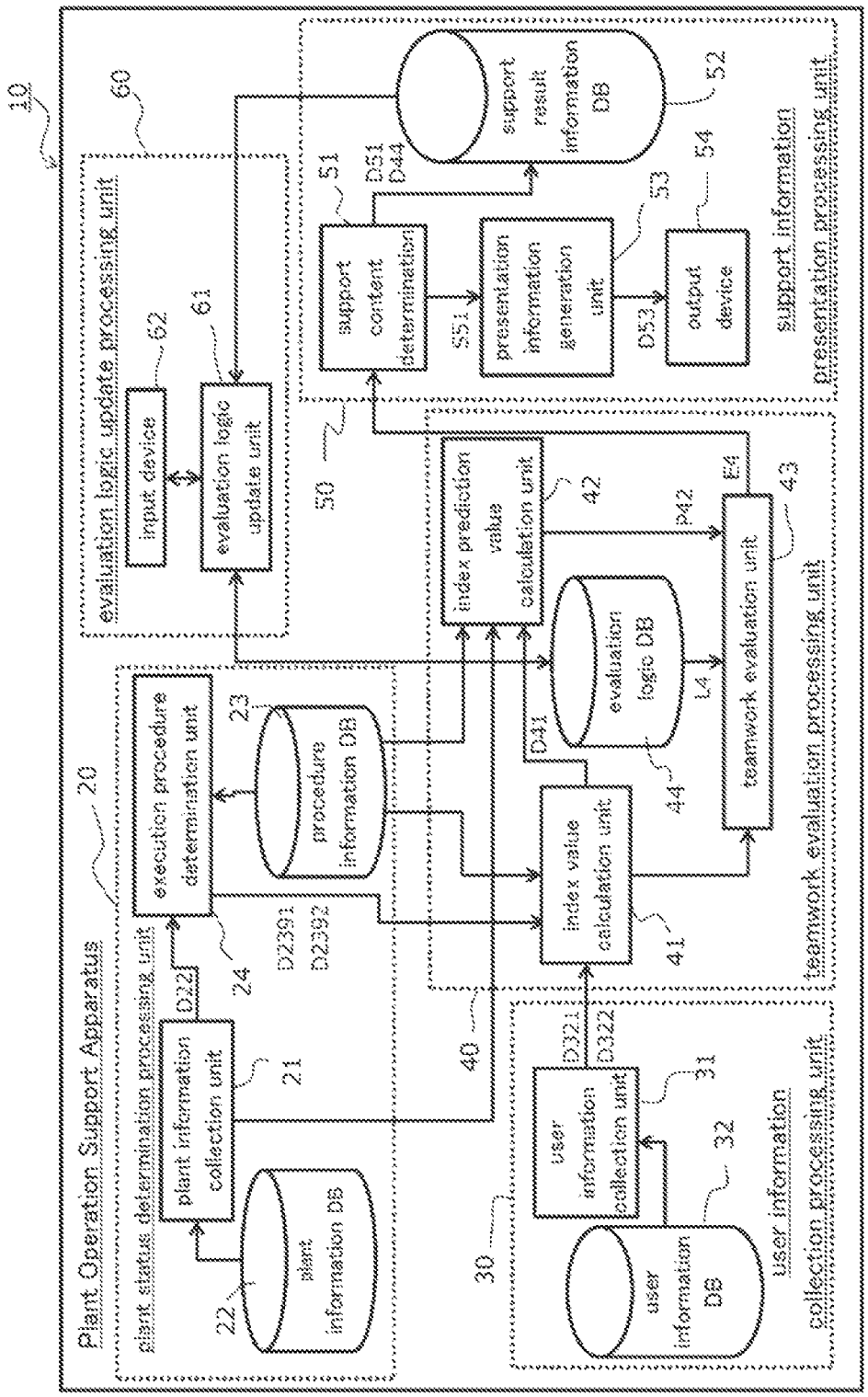
FIG. 1 is a block diagram for explaining a configuration of a plant operation support apparatus according to Embodiment 1.
Figure 2:
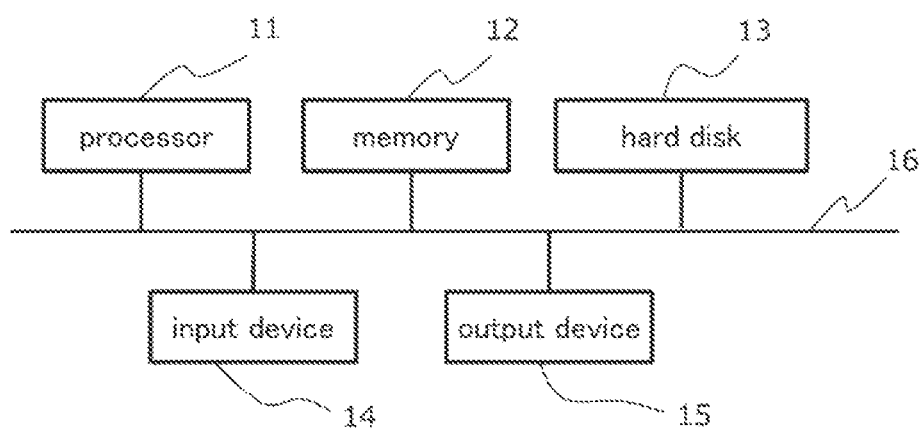
FIG. 2 is a diagram showing a hardware configuration of the plant operation support apparatus according to Embodiment 1.
Figure 3:
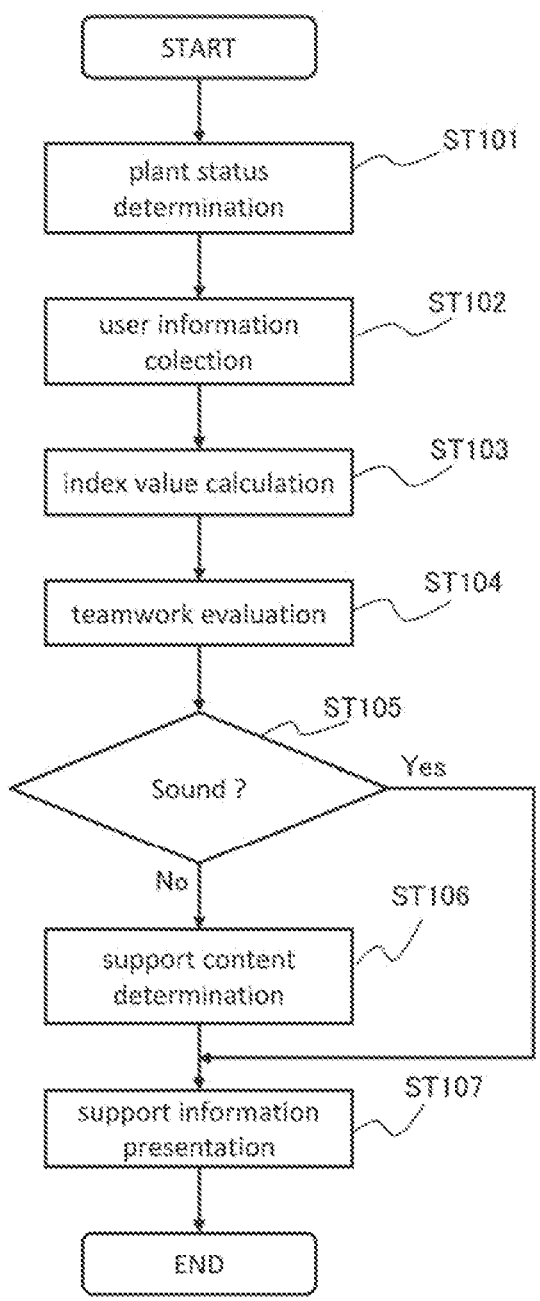
FIG. 3 is a flowchart for explaining operation of the plant operation support apparatus according to Embodiment 1.
Figure 4:
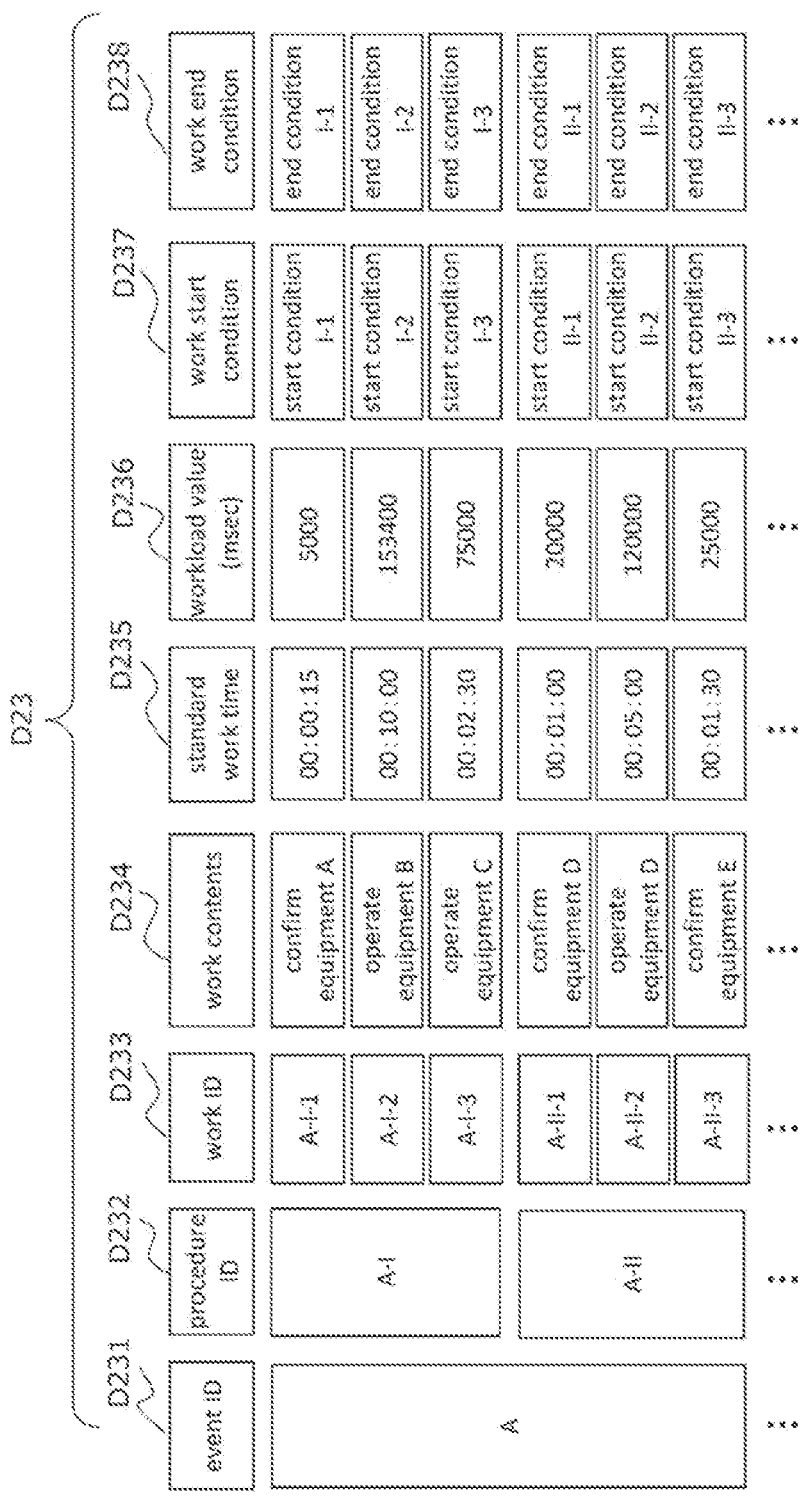
FIG. 4 is a diagram showing a data structure stored in a procedure database in the plant operation support apparatus according to Embodiment 1.

FIG. 1 to FIG. 13 are diagrams for explaining a plant operation support apparatus or a plant operation support method according to Embodiment 1, FIG. 1 is a block diagram for explaining a configuration of the plant operation support apparatus, FIG. 2 is a block diagram showing an example of a hardware configuration of the plant operation support apparatus, and FIG. 3 is a flowchart for explaining operation of the plant operation support apparatus, that is, a plant operation support method. Further, FIG. 4 is a diagram showing a data structure stored in a procedure database constituting the plant operation support apparatus.

Figures 5, 6:
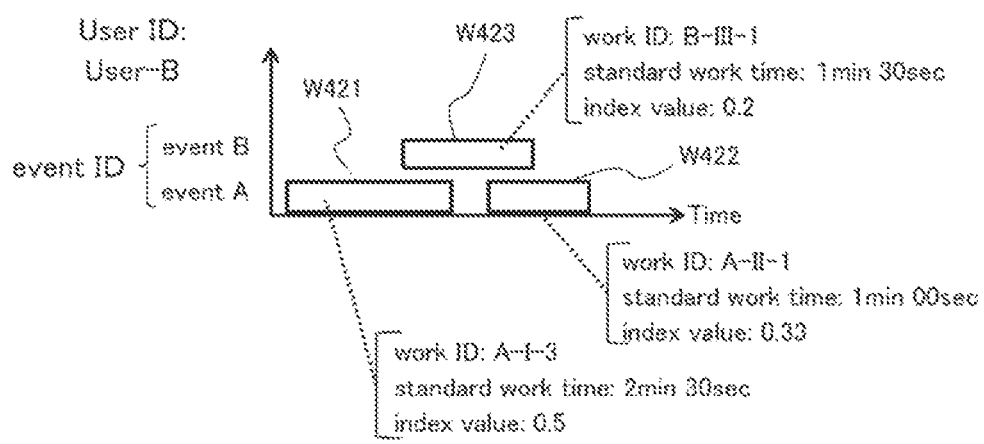
FIG. 5 is a diagram in which part of index values calculated for a certain user is visualized in the plant operation support apparatus according to Embodiment 1.
FIG. 6 is a diagram showing a data structure of index prediction values of a workload calculated by an index prediction value calculation unit in the plant operation support apparatus according to Embodiment 1.
Figure 7:
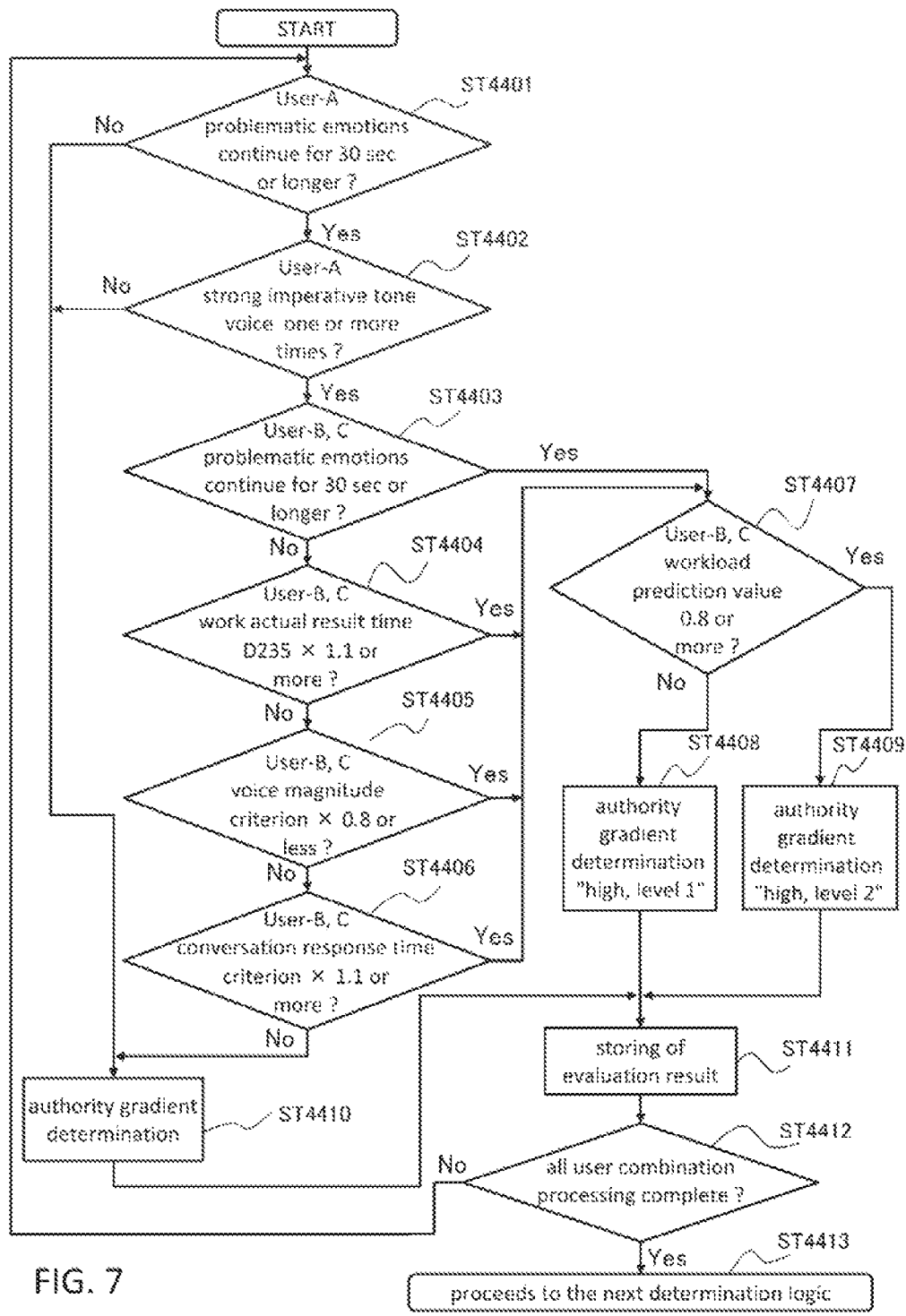
FIG. 7 is a flowchart showing an evaluation logic for determining whether or not an authority gradient stored in an evaluation logic database is high in the plant operation support apparatus according to Embodiment 1.
Figure 8:
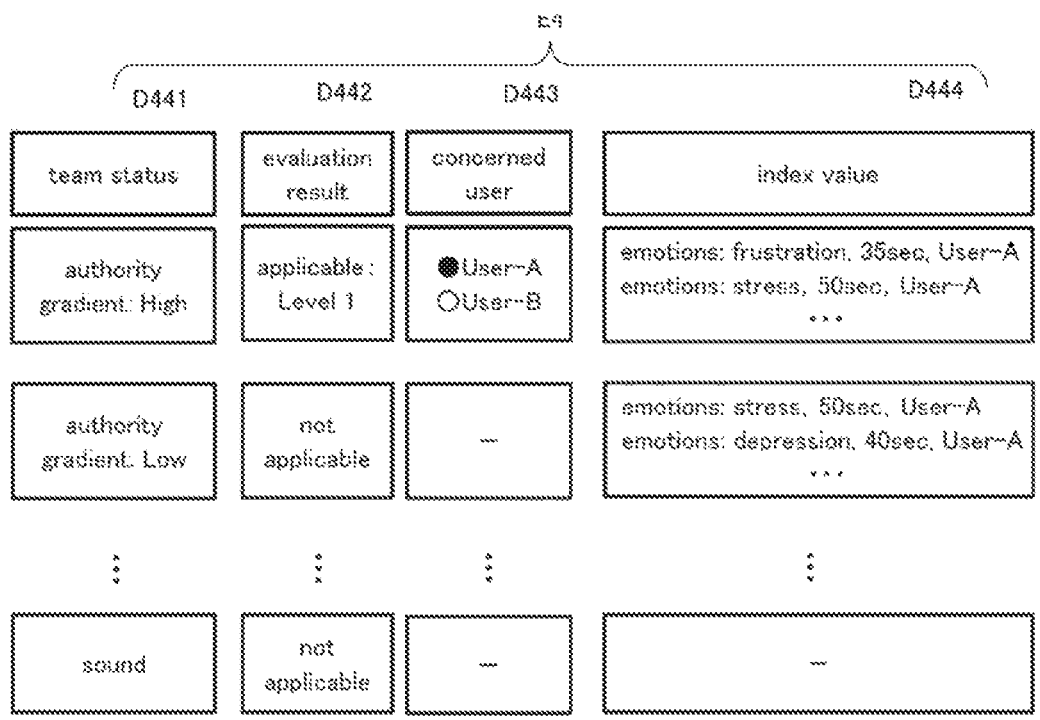
FIG. 8 is a diagram showing a data structure of teamwork evaluation data evaluated by a teamwork evaluation unit in the plant operation support apparatus according to Embodiment 1.

FIG. 5 is a diagram in which part of index values calculated for a certain user are visualized in time series, which are calculated by an index prediction value calculation unit, and FIG. 6 is a diagram showing a data structure of index prediction values of a workload calculated for each of users by the index prediction value calculation unit. FIG. 7 is a flowchart showing a structure of an evaluation logic for determining whether or not an authority gradient stored in an evaluation logic database is high, FIG. 8 is a diagram showing a data structure of teamwork evaluation data evaluated by a teamwork evaluation unit, and FIG. 9 is a diagram showing a data structure of a support content determination table included in a support content determination unit.

Figure 10:
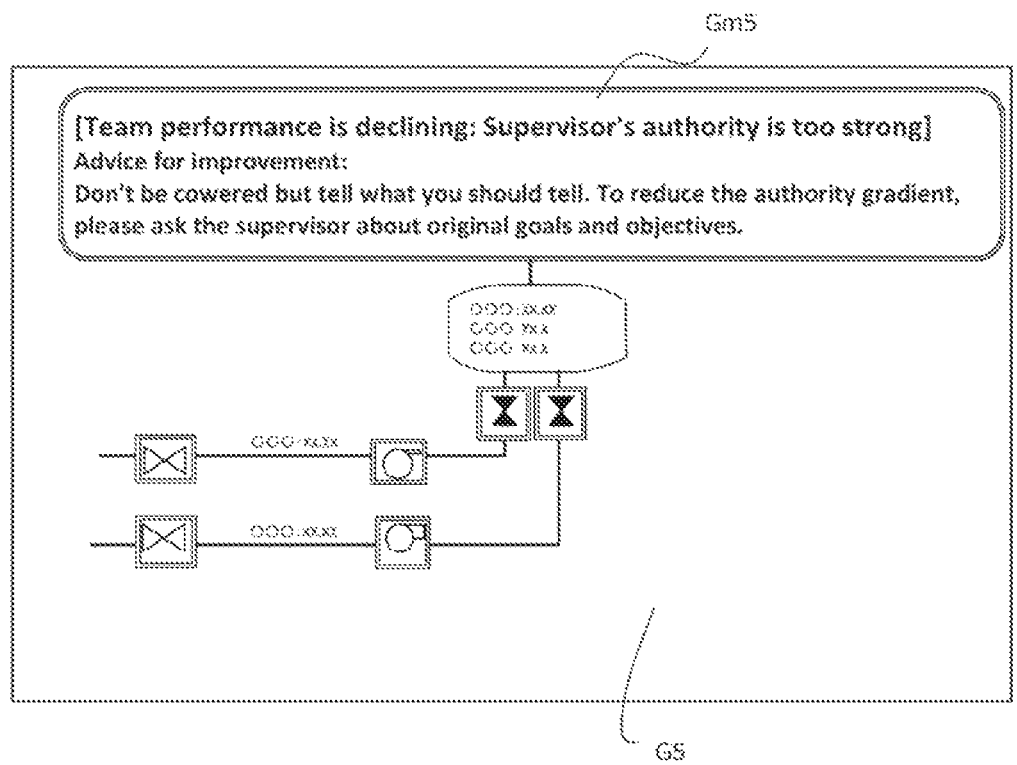
FIG. 10 is a diagram showing an example of screen display of operation support information when team performance is evaluated to have deteriorated in the plant operation support apparatus according to Embodiment 1.
Figure 11:
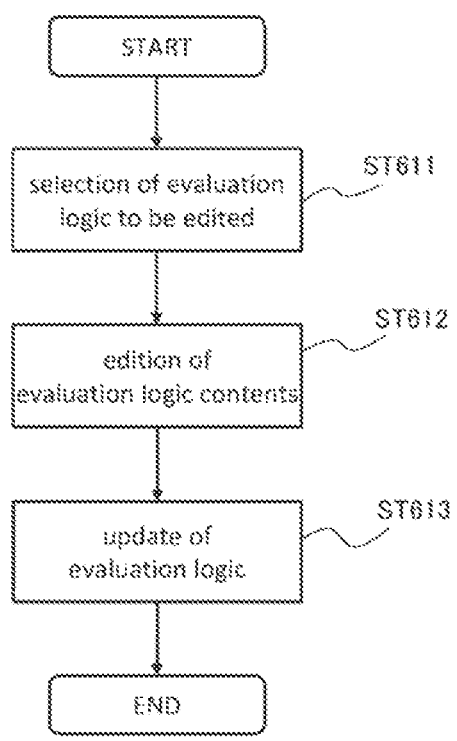
FIG. 11 is a flowchart for explaining operation for updating the evaluation logic in the plant operation support apparatus according to Embodiment 1.
Figure 12:
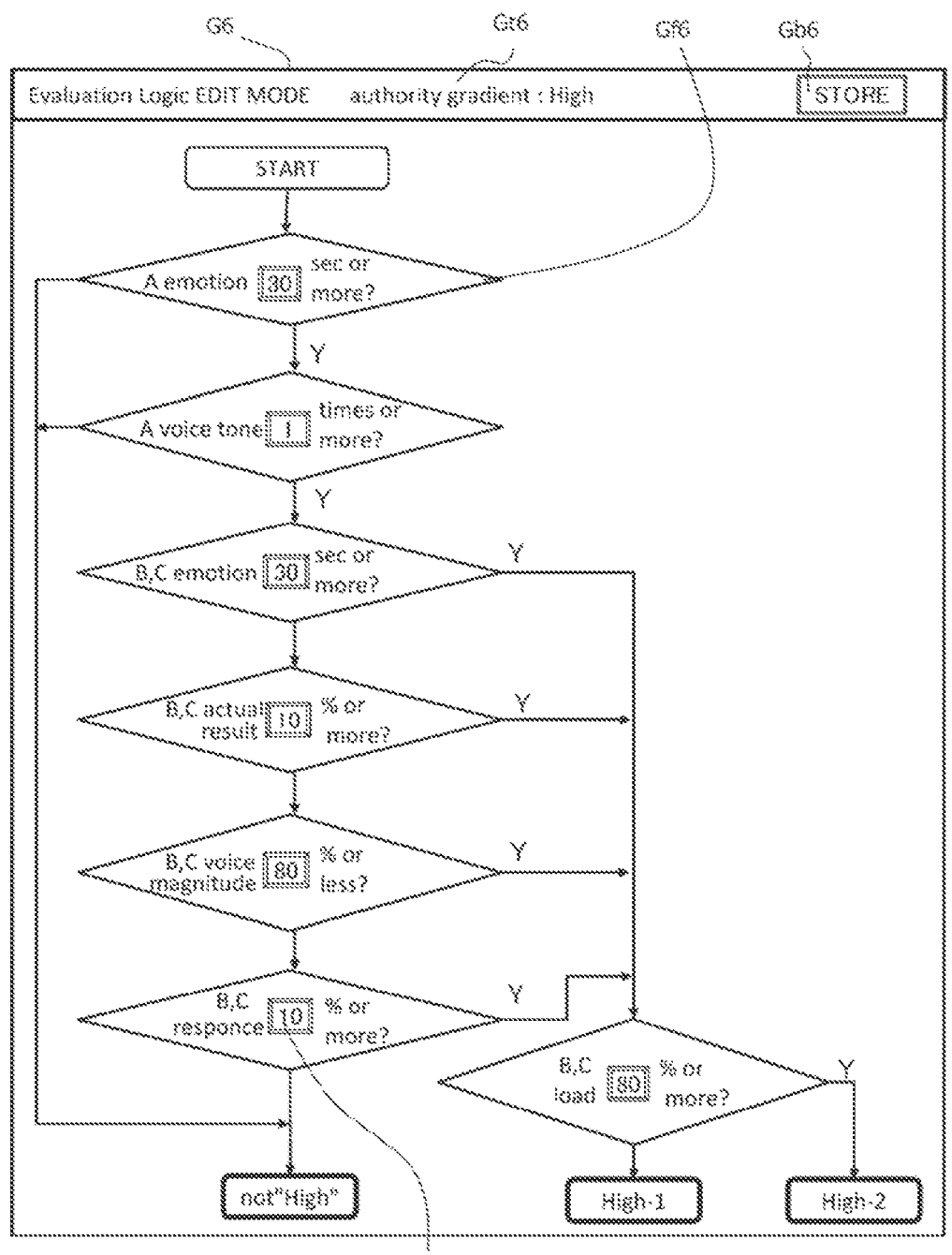
FIG. 12 is a diagram showing an example of screen display when the evaluation logic is edited by screen operation in the plant operation support apparatus according to Embodiment 1.
Figure 13:
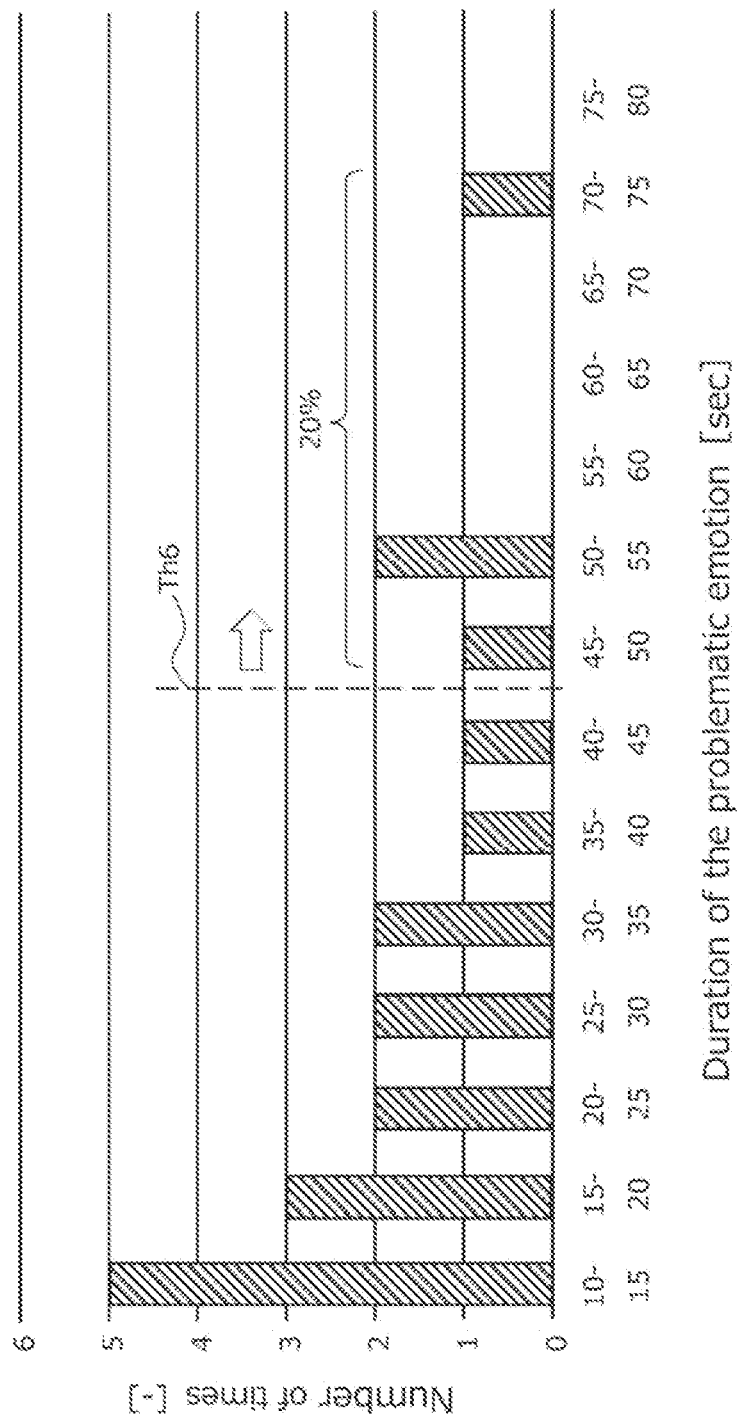
FIG. 13 is a diagram for explaining data for determining a start of change when the evaluation logic is automatically changed in the plant operation support apparatus according to Embodiment 1.

FIG. 10 is a diagram showing an example of screen display of operation support information when team performance is evaluated to have deteriorated from the viewpoint of the authority of a supervisor, FIG. 11 is a flowchart for explaining operation for updating the evaluation logic, FIG. 12 is a diagram showing an example of screen display when the evaluation logic is edited by screen operation, and FIG. 13 is a diagram for explaining data for determining a start of change when the evaluation logic is automatically changed.

Before a detailed description of the plant operation support apparatus and the plant operation support method according to Embodiment 1 of the present application, operation of a plant by an operating team as a premise will be described. In general, the plant is operated by an operating team consisting of a plurality of members that monitors and operates a central control panel in a monitoring and control room. The team consists of several operators who perform monitoring and the operation, and a supervisor who provides work instructions to operators and monitors their actions. Each of the operators and the supervisor are provided with dedicated input and output devices for the monitoring and control (input/output devices), which monitor and control the plant using the input/output devices provided to each of them.

In a typical operation method of the plant, a supervisor first instructs an operator on work contents. The operator carries out the work using the input and output devices that are provided. After the work is performed, the operator reports the completion to the supervisor, who uses his or her input/output device to confirm the work performed by the operator. Note that, as an operation mode of the plant, in addition to the operation in which all members of the operating team are present in the monitoring and control room while communicating orally, a remote communication between the operators in the monitoring and control room and the supervisor at a remote location is also assumed.

In particular, in the operation of large-scale plants, each operator performs his or her assigned tasks in accordance with instructions from the supervisor that are consistent with a procedure. Under a situation where the workload is high for operators, such as a situation where task execution within a limited period of time is required, reduction in the work efficiency and human errors such as operation errors and errors in situation recognition may occur. In order to achieve appropriate plant operation, it is necessary to take measures to improve the performance as a team, such as those facilitating communication among operators without making them to cower with the understanding of the status of the teamwork.

Based on the premise described above, the plant operation support apparatus and the plant operation support method according to Embodiment 1 of the present application will be described in detail. As shown in FIG. 1, the plant operation support apparatus 10 of the present application includes a plant status determination processing unit 20 for determining status of the plant (not shown), and a user information collection processing unit 30 for collecting and processing user information. Further, a teamwork evaluation processing unit 40 for evaluating teamwork status from information relating to the situation of the plant and the user on the basis of an evaluation logic L4, and a support information presentation processing unit 50 for presenting support information based on an evaluation result (teamwork evaluation data E4) are provided. Further, an evaluation logic update processing unit 60 for updating the evaluation logic L4 used for the evaluation of the teamwork status, which is a characteristic component of the present application, is provided.

The plant status determination processing unit 20 includes a plant information collection unit 21 for collecting plant information, a plant information database 22 for storing collected data, a procedure database 23 for storing operation procedure data, and an execution procedure determination unit 24 for identifying a current work step. In the figure, the database is abbreviated to "DB".

The user information collection processing unit 30 includes a user information collection unit 31 for collecting data of the supervisor and the operators (collectively referred to as users) constituting the operating team, and a user information database 32 for storing the collected user information.

The teamwork evaluation processing unit 40 includes an index value calculation unit 41 for calculating the index values (index data D41) necessary for teamwork evaluation, an index prediction value calculation unit 42 for calculating time-series index prediction values P42 for each of the user, and a teamwork evaluation unit 43 for evaluating the teamwork. Further, an evaluation logic database 44 storing the evaluation logic L4 used for the teamwork evaluation is provided.

The support information presentation processing unit 50 includes a support content determination unit 51 for determining support contents on the basis of the teamwork evaluation result (teamwork evaluation data E4), a support result database 52 for storing the determined support contents, and a presentation information generation unit 53 for generating presentation data in accordance with the support contents. Furthermore, a plurality of output devices 54 that are allocated to the respective operators and the supervisor who constitute the team and present the generated presentation information to users who need it are provided.

The evaluation logic update processing unit 60 includes an evaluation logic update unit 61 for updating the evaluation logic L4 on the basis of the data of the support contents accumulated in the support result database 52 and the data stored in the evaluation logic database 44. Further, an input device 62 for receiving necessary data input by a user at the time when the evaluation logic L4 is updated is provided.

It should be noted that the above description indicates that the plant operation support apparatus 10 is constituted by a combination of a plurality of functions and does not mean that the plant operation support apparatus 10 is constituted by a combination of independent hardware such as the execution procedure determination unit 24 and the index value calculation unit 41. For example, as shown in FIG. 2, it may be configured by a processor 11, a memory 12, a hard disk 13, an input device 14, an output device 15, and a system bus 16 connecting these devices, and each function may be implemented by software that is installed.

The memory 12 and the hard disk 13 function as storage devices, and although not shown, a volatile storage device such as a random access memory and a non-volatile auxiliary storage device such as a flash memory are provided. Further, the hard disk may be provided as an auxiliary storage device in place of the flash memory. The processor 11 executes a program input from a storage device. In this case, the program is input from the auxiliary storage device to the processor 11 via the volatile storage device. Further, the processor 11 may output data such as calculation results to the volatile storage device as a storage device or may store data in the auxiliary storage device via the volatile storage device.

Next, referring to the flowchart of FIG. 3, the operation until the plant operation support apparatus 10 performs the teamwork evaluation on the basis of the plant status and the user status (user information) and presents the support information to the output device 54 when support is required will be described.

Note that, as described above, in actual operation management of the plant, an entire description on the actual plant operation management in which a plurality of members (users) and a plurality of pieces of work are related to each other within the time series will be complicated and difficult to be organized. Therefore, in Embodiment 1, an example will be described in which the operating team is composed of three users including one supervisor and two operators necessary to clarify the technical idea of the present application, out of the members of the team (supervisors and operators). Therefore, in the data handled by each database or processing units, the supervisor is set as User-A, the operators are set as User-B and User-C, and an individual who does not need to be distinguished in the role is simply referred to as a user.

First, a description will be given for a plant status determination step ST101 in which the plant status determination processing unit 20 determines a procedure and a work step performed by the user on the basis of the plant information and operation procedure information and transmits the result to the teamwork evaluation processing unit 40.

The plant information collection unit 21 periodically collects plant data D22 from the plant information database 22 and transmits the collected data along with the time at which the collected data is obtained to the execution procedure determination unit 24. The plant information database 22 stores plant status information including operation status and parameter values including alarms for various plant equipment such as pumps and valves, and operation log information, which is information on operation logs of the operators and the supervisors. The operation log information includes the work contents (including work identification information D233 to be described later), user identification information D321 indicating a user ID, and time data. The data in the plant information database 22 may be real-time data generated by a plant or data recorded in the plant operation in the past.

As shown in FIG. 4, the procedure database 23 stores a corresponding procedure for each of events and information on the work steps constituting the procedure. The procedure information D23 defines one or more procedures for each event, and the procedures consist of one or more work steps. Event identification information D231 indicating an event ID is assigned to an event, procedure identification information D232 indicating a procedure ID is assigned to a procedure, and work identification information D233 indicating a work ID is assigned to each work step. In the work step, standard work time information D235 indicating a standard work time, workload value information D236 indicating a workload value, work start condition information D237 indicating a work start condition, and work end condition information D238 indicating a work end condition are defined.

The standard work time is the time normally required to carry out each operation step (including waiting time depending on plant behavior). The workload value corresponds to a load (workload) applied to human work (confirmation and operation of an object, etc.) in the execution of a work step. The workload value is, for example, a time required for human action. For example, by a method based on a known human information processing model, a workload value can be calculated by adding together the time for human perception and cognitive processing in the brain, and the time for physical movement of the body when a work step is executed. The work start condition and the work end condition are conditions for starting and ending the work step. As examples of the work start conditions, the operation log (determination of operation that has been started), parameter values of plant equipment serving as an operation start condition, and an alarm issuance, and as the work end conditions, for example, conditions of parameter values and an alarm stop of the plant equipment, are defined.

The execution procedure determination unit 24 receives the plant status information and the operation log information from the plant information collection unit 21, and identifies an occurring event, a corresponding procedure associated with the event, and the current work step. Inside the execution procedure determination unit 24, a knowledge base is provided in which data necessary for determining the event, such as a relationship between a failure cause and an event propagation, is stored. An event is identified using the obtained plant status information, and the event identification information D231 corresponding to the event is obtained by referring to the procedure database 23.

Then, based on the operation log information, a procedure ID and a work ID that are ongoing are identified referring to the work start condition information D237 and the work end condition information D238. When it is determined for the first time that the work start condition and the work end condition are satisfied, the work start time and the work end time are recorded as work start time information D2391 and work end time information D2392, respectively. Information on the procedure ID and the work ID that are identified, and the working user ID (procedure identification information D232, work identification information D233, user identification information D321) is transmitted to the teamwork evaluation processing unit 40 together with the work start time information D2391 and the work end time information D2392. Thus, the step ST101 is completed, and the process proceeds to a step ST102.

Next, a user information collection step ST102 in which the user information collection processing unit 30 collects time-series user information and transmits the collected information to the teamwork evaluation processing unit 40 will be described.

The user information database 32 stores time-series sensor data (for example, biological data) of each user acquired by a contact type or non-contact type sensor. The user information collection unit 31 periodically collects biological data stored in the user information database 32. The user information database 32 stores the user identification information D321 for identifying each user and time-series data (sensor data D322) of various sensors in association with each other.

Examples of the user ID in this example are User-A for the supervisor, User-B and User-C for the operators as described above. The sensor data D322 is a combination of time data and a sensor value that are acquired, and examples include a heart rate, voice, respiration, a cardiac waveform, a blood pressure, a body temperature, and the like. The user information collection unit 31 transmits the user identification information D321 and the various sensor data D322 to the index value calculation unit 41 of the teamwork evaluation processing unit 40 at a predetermined cycle.

Thus, the step ST102 is completed, and the process proceeds to a step ST103. Note that the plant status determination step ST101 and the user information collection step ST102 may be performed in parallel.

Next, the index value calculation step ST103 and a teamwork evaluation step ST104 by the teamwork evaluation processing unit 40 will be described. The teamwork evaluation processing unit 40 calculates the index values and the index prediction values necessary for the teamwork evaluation on the basis of input data from the plant status determination processing unit 20 and the user information collection processing unit 30 (step ST103) and evaluates the teamwork status comprehensively with these values (step ST104). When it is evaluated that the team status is not sound ("No" in step ST105), the evaluation result is transmitted to the support information presentation processing unit 60.

In the index value calculation step ST103, the index value calculation unit 41 calculates index values necessary for the teamwork evaluation. Examples of the indices include an index calculated for each individual user, and a teamwork index between the plurality of users such as between the operators and the supervisor and between the operators. Examples for the personal indices include those related to utterance, a tone of voice, emotion, and the workload.

For example, in the case of the utterance, a volume of the voice, an utterance speed, and the choice of words (the number of times a particular word is spoken, word details, etc.) are used as indices, and in the case of the tone of voice, the number of times of "spoken in a strong imperative tone of voice" and "spoken in an overbearing tone of voice" are used as indices. As for the emotion, the start time, end time, and duration of emotional expression such as normalcy, excitement, joy, stress, frustration, depression, fatigue, tension, tranquility, and relaxation are used as indices. Further, as for the workload, an increase or decrease in a work actual result time with respect to the standard work time, the number of work steps executed simultaneously in parallel, and the like are the indices. Furthermore, as an index between the plurality of users, for example, an index relating to communication such as a degree of matching in conversation patterns (how much the conversation patterns match a series of patterns such as an instruction from the supervisor to an operator, repetition of instruction contents by the operator, and result reporting by the operator), an interval (time) between conversations, and the like can be listed.

Inside the index value calculation unit 41, an analysis logic for calculating each of the index values is provided. The personal index is calculated for each user in the operating team, and the index between the plurality of users is calculated together with input data from the plurality of users. The index related to the utterance, which is the personal index, is calculated by analyzing time-series voice data. For example, the volume of the voice is calculated from a sound pressure level of the voice data, and the utterance speed, the choice of words, and the tone of the voice are calculated from the result obtained by performing voice recognition and converting it into text data. The sound pressure level or the utterance speed is calculated as to how much it increases or decreases for each user as compared with a standard value (such as an index value measured in advance at a normal time).

For example, in the case of the volume of the voice, if the volume of the operator (User-B) is 50 dB and the standard value is 60 dB, it is calculated to be −17% (=(50−60)/60). Emotional indices can be calculated on the basis of the voice data and biological data such as the heart rate and the respiration. As for the work actual result time among the indices related to the workload, information on the work matching the work ID obtained from the execution procedure determination unit 24 is referred to from the procedure database 23.

Then, the time from when the work start condition is satisfied and the work is started to the time when the work end condition is satisfied (until the current time if the work end condition is not satisfied) is measured as the work actual result time, and the difference from the standard work time is calculated. For example, when the obtained work ID is A-I-2, if there is work end time information D2392 in the output data of the execution procedure determination unit 24, it is assumed that the step execution concerned is completed. Then, the difference between the work end time (for example, 12:23:50) and the work start time information D2391 (for example, 12:23:41) is calculated (0 hour: 0 minute: 9 seconds). Further, a time (0 hour: 0 minute: −1 second) is obtained by subtracting the standard work time indicated in the standard work time information D235 from the difference.

On the other hand, when there is no data in the work end time information D2392, assuming that the step concerned is under execution, the difference (0 hour: 0 minute: −4 seconds) between the current time (for example, 12:23:45) and the work start time is calculated and a time (−0 hour: 0 minute: 6 seconds) is obtained by subtracting the standard work time from the difference.

The number of work steps executed simultaneously in parallel is determined from the user IDs, the procedure IDs, and the work IDs received from the execution procedure determination unit 24. In addition, as for the degree of matching in the conversation patterns, which is the index between the plurality of users, the degree of matching in the conversation patterns is calculated by converting the voice data into text data through the voice recognition, and extracting words and phrases indicating the instruction, the repetition, the result reporting, and the like. For example, the instruction may be extracted as words and phrases indicating "Please do XX for XX", the repetition as "I will do XX for XX", and the result reporting as "I did XX for XX".

The index relating to the response time in the conversation is obtained by calculating the interval between utterances in the conversation that can be extracted as a conversation pattern and calculating the ratio of the increase or decrease time compared with the reference time included in the analysis logic. For example, if there is a period of 5 seconds in the response to a certain utterance and the reference time is set to 2.5 seconds, then it is calculated to be 100% (=(5−2.5)/2.5) increase. Note that the above described analysis method is an example, and the implementation method is not limited to the above.

The index value calculation unit 41 accumulates the index value of each index, data used for the index calculation, user IDs, and processing time data as time-series data in the database held in the index value calculation unit 41. As the data used for the index calculation, voice data, biological data, conversation text data, and the like are accumulated, and as the user ID, one user ID is stored in the case of the personal index, and a plurality of user IDs concerned are stored in the case of the indices between the plurality of users. As the processing time data, for example, a time at which the index value is calculated is accumulated.

Further, the work actual result time obtained at the time of calculating the index value of the workload described above is accumulated as the index data D41 in the database held in the index value calculation unit 41 together with the procedure ID, the work ID, the standard work time, and the user ID. At the time, current time data (work actual result recorded time) and data (work step execution status information) indicating whether or not the work step has been completed (work completed or work in progress) are also accumulated as the index data D41. Thus, among the processes in the step ST103, the index value calculation process is completed.

The index prediction value calculation unit 42 calculates time-series index prediction values of each user by predicting a trend of future index values as the calculation step of the index prediction values inside the step ST103 and transmits the result to the teamwork evaluation unit 43. Here, an example of predicting an index value of a future workload will be described. The index prediction value calculation unit 42 is composed of a function of simulating future plant operation and a function of predicting an index value and predicts the workload value of a work step to be executed in the future for each user on the basis of these functions.

First, on the basis of the index data D41 transmitted from the index value calculation unit 41, the procedure ID, the work ID, the work actual result time, the work step execution status information, and the standard work time, at a latest work actual result recorded time for the work performed by a specific user, are acquired. Then, by referring to the procedure information D23 stored in the procedure database 23, predicted values of a start time and an end time of each procedure step occurring after the work ID of the procedure ID concerned are calculated. Examples of the prediction method include a method in which a time satisfying the work start condition is calculated as the start time by performing a plant simulation and the end time is calculated by adding the standard work time to the start time, and a method in which the work start time is calculated in the same manner and a time satisfying the work end condition is determined as the end time by performing a plant simulation.

Note that, when work step execution status of the work ID concerned is "work in progress", the end time of the work step concerned is predicted, and the plant simulation is performed in consideration of the predicted end time. The prediction of the end time is calculated, for example, as a time obtained by adding the difference of the work actual result time from the standard work time until the completion of the work step, to the work actual result recorded time. The processing up to this point is performed until the end time of a procedure step exceeds a predetermined time (for example, 30 minutes) or until all the work steps within the event are processed. Further, if the user concerned performs another work step in parallel, the same processing is performed for another work step.

Next, the calculation of an index value of a workload occurring after the work actual result recorded time will be described referring to FIG. 5 in which part of the index values are visualized in time series for a certain user for the sake of explanation. In FIG. 5, the user ID is "User-B", the horizontal axis represents time, the rectangles representing work W421 to work W423 indicates the standard work time by the length thereof, and their left and right ends represent the start time and the end time, respectively. The overlapping portions along the vertical axis indicate work to be performed in parallel.

The ratio of the workload value (actual time related to human action) included within the standard work time is used for the index value as an example. For example, the work W421 is the work whose work ID is A-I-3, and since the workload value is 75000 milliseconds (refer to FIG. 4) with respect to the standard work time of 2 minutes and 30 seconds (150 seconds), the index value is 0.5. The index value in the period of time in which no work occurs is zero, and in the period of time in which the plurality of pieces of work performed in parallel, a numerical value obtained by summing the index values for the work W421 to the work W423 is used as the index value. In this manner, time-series data of the index values are calculated at predetermined intervals (for example, in units of one second).

The processing for the calculation described above is performed for all of the users, and the index prediction values P42 of the workload of each user shown in FIG. 6 is transmitted to the teamwork evaluation unit 43. Thus, the step ST103 is completed, and the process proceeds to the step ST104.

In the teamwork evaluation step, the teamwork evaluation unit 43 evaluates the teamwork within the team on the basis of the time-series data of various index values accumulated in the index value calculation unit 41 and the index prediction values P42 output from the index prediction value calculation unit 42 (step ST104). When the teamwork is not sound as the result of the evaluation ("No" in step ST105), the evaluation result is transmitted to the support content determination unit 51 of the support information presentation processing unit 50, and the process proceeds to the support process (steps ST106 to ST107). In contrast, when the teamwork is sound ("Yes" in step ST105), the process does not proceed to the support process and ends.

The teamwork evaluation unit 43 executes an evaluation process on the basis of the evaluation logic L4 stored in the evaluation logic database 44. Inside the evaluation logic L4, there are one or more quantitative criteria for determining whether or not the status is such that a teamwork failure is caused (for example, unusually high or low authority gradient between the supervisor and an operator, performance degradation for a particular user in the team, etc.).

For example, as an example of the evaluation logic L4, as shown in FIG. 7, a description will be made using the evaluation logic L4 for determining whether or not "authority gradient is high" is applicable among the teamwork failures. Note that the term "high authority gradient" refers to a situation in which the authority of the supervisor is abnormally high with respect to an operator, making the operator to cower, and it is difficult to communicate properly with the supervisor. As described above, User-A indicates the supervisor, User-B, and User-C indicate the operators, and evaluation steps ST4401 and ST4402 in the evaluation logic LA indicate determination steps on the supervisor, and evaluation steps ST4403 to ST4407 indicate the determination steps on the operators.

As a result of these steps, it is determined that the authority gradient being high is "not applicable" (step ST4410), indicating the soundness, or it is determined that the authority gradient being high is "applicable" (step ST4408 or ST4409), not indicating the soundness. In this example, when the authority gradient being high is "applicable", two levels are set so that the degree of the gradient can be determined. Using the index prediction value (workload in this example) calculated by the index prediction value calculation unit 42, in the evaluation step ST4407, the evaluation is divided into the two levels (higher degree of urgency corresponds to level 2) from the viewpoint of the degree of urgency for a countermeasure against a present teamwork failure prepared for the future plant operation status. Thus, the support information presentation processing unit 50, which will be described later, can present different support contents for each level.

In the evaluation steps ST4401 to ST4407, referring to various index values (index data D41) accumulated in the index value calculation unit 41 and the index prediction values P42 calculated by the index prediction value calculation unit 42, it is determined whether or not an evaluation criterion is satisfied in each evaluation step. For example, with regard to the evaluation of the emotional index in the evaluation steps ST4401 and ST4403, it is determined whether or not the emotion that causes a problem in the teamwork continues for 30 seconds or longer in succession until latest processing time data. For example, in the step ST4401 for evaluating the supervisor (User-A), a screening evaluation in which frustration and stress are regarded as problematic emotions is performed, and if the problematic emotions continue for 30 seconds or longer, it is determined that the process should proceed to the next evaluation item, and if not, it is determined to be "not applicable".

Then, in the evaluation step ST4402, it is determined whether or not there are one or more times of "utterance in a strong imperative tone of voice" in the index value relating to the tone of voice, and if there is one or more times of the strong imperative tone of voice, it is determined that the status should be determined whether or not the authority gradient is high, and if not, it is determined to be "not applicable". That is, a secondary screening evaluation is performed to determine whether or not the evaluation on the authority gradient being high is needed. Thus, by the screening evaluation depending on the status of the supervisor, it is determined in the subsequent evaluation steps whether or not the authority gradient is high, that is, whether or not influence thereof is exerted on the operator side.

In the step ST4402, for the operators (User-B, User-C) as the target, if the problematic emotion such as depression, fatigue, and tension continues for 30 seconds or longer, it is determined that the authority gradient is high, and if not, the process proceeds to the next evaluation item. Note that, in the determination process of the step, preprocessing such as noise removal (short interruption in the duration of the emotional expression, etc.) of the index values in the time series may be performed.

In each of the steps ST4401 and ST4403, the type of emotion held by the user can be determined by, for example, whether or not a combination of waveforms such as a brain wave and a heartbeat matches a pattern stored in advance. Furthermore, the duration of the state can be used to measure the duration of the problematic emotion. That is, it is possible to determine "Yes" or "No" in a quantitative manner by using the time-series biological data collected by the user information database 32.

In the evaluation step ST4404, the standard work time of the work step at the latest time stored in the index value calculation unit 41 is compared with the work actual result time, and it is determined whether or not the work actual result time is longer than the standard work time by 10% or more (D235×1.1 or more). Note that the method is not limited to the above, the calculation and the determination not only with the work step at the latest time but also with the work steps before the latest time included may be possible.

As for the volume of voice (magnitude of voice) in the evaluation step ST4405, a criterion is a voice index value of the sound pressure level at the latest processing time in the index value calculation unit 41, for example, if it is equal to 0.8 of the criterion or less, it is determined that the operator cowers and the volume of voice is reduced, that is, the authority gradient is high. The response time (conversation response time) within a conversation in the evaluation step ST4406 is determined by a criterion of the index value of the interval between utterances within the conversation in the latest processing time data in the index value calculation unit 41. For example, if the conversation response time is 10% or longer than the criterion (criterion×1.1 or more), the operator cowers, causing the interval to be longer; that is, it is determined that the authority gradient is high.

In any of the steps ST4403 to ST4406, if it is determined that the authority gradient is high, the evaluation step ST4407 determines the level of the authority gradient on the basis of the index prediction values P42 about the time-series workload output from the index prediction value calculation unit 42. For example, if the workload prediction value is 0.8 or more ("Yes"), the level is determined to be the level 2 indicating a high level, and if it is less than 0.8

("No"), the level is determined to be the level 1 indicating a low level. That is, each step is a logical formula for comparing the threshold value and the index value and outputting whether or not it is Yes or No, and the evaluation logic LA can output a plurality of types of evaluation results by combining a plurality of logical formulas.

In the evaluation logic L4 shown as an example, the evaluation is performed for the supervisor and each of the operators, and after reaching any one of steps ST4408 to ST4410, the evaluation result is stored, and the user ID of the user concerned is also stored if the authority gradient is determined to be high (ST4411). The users concerned are defined to be a user (the supervisor in the case of "authority gradient"), which is the primary factor when it is determined that the authority gradient is high; that is, when it is determined that teamwork is not sound, and a user who is set as "Yes" in the evaluation item among the users of the secondary factor (the operators in the case of "authority gradient"). Thereafter, it is determined whether there are any other users who are subject to the evaluation processing (step ST4412), and if there are any other users who are subject to the processing, the process returns to the step ST4401, and otherwise, the process proceeds to the next determination logic (step ST4413).

As an example, the process of evaluating the teamwork between the supervisor (User-A) and the operator (User-B) will be described. It is assumed that the operator is performing the work with the work ID A-I-1. In the step ST4401, as a result of the emotion index value of the supervisor (User-A), if the frustration continues for 35 seconds and the stress continues for 33 seconds, the process proceeds to the step ST4402. In the step ST4402, if one "utterance in a strong imperative tone of voice" is included in the index for the tone of voice of the supervisor (User-A), the process proceeds to step ST4403 for evaluating the status of the operator.

If the duration of the depression, fatigue, and tension of the operator (User-B) is 28 seconds, 25 seconds, and 20 seconds, respectively, the process proceeds to the step ST4404 in which the next evaluation item is executed. In the step ST4404, if the difference of the work actual result time from the standard work time of the operator (User-B) is "0 hour: 0 minute: −6 seconds", since it is 40% shorter than the standard work time (15 seconds), the process proceeds to the step ST4405 in which the next evaluation item is executed. If the volume of the voice of User-B is 17% smaller than the criterion (criterion×0.83) in step ST4405, the process proceeds to step ST4406 in which the next evaluation item is executed.

In the step ST4406, if the conversation response time between the supervisor (User-A) and the operator (User-B) is 50% higher than the criterion (criterion×1.5), it is determined that the authority gradient is high, and the process proceeds to the step ST4407. In the case where the index prediction values P42 of the workload are the data shown in FIG. 6, since the maximum value of the index prediction values P42 of the workload for User-B is 0.71, there is no time when they exceed the criterion of 0.8 in the step ST4407. Therefore, it is determined that the authority gradient is high but the level is level 1 indicating the low level (step ST4408).

In this way, as a result of evaluating the evaluation logic L4 firstly with respect to the authority gradient described in FIG. 7 and the evaluation logic L4 with respect to all other evaluation targets, teamwork evaluation data E4 as shown in FIG. 8 is created. The data created as team status information D441 indicates a team status that identifies each teamwork failure. Evaluation result information D442 is data indicating an evaluation result for each team status, and a result corresponding to "authority gradient: high" indicates that "authority gradient: high, applicable to level 1" and a result corresponding to "authority gradient: low" indicates "not applicable". Further, the evaluation result for the team status "Soundness" is "applicable" only when all the evaluation results for the team failure are "not applicable".

As for the users concerned, information D443 of the users concerned is created in which the user ID identified when the determination of the teamwork failure is made is associated with a mark for identifying the degree of contribution to the failure factor ("•" in the case of the user of the primary factor and "○" in the case of the user of the secondary factor). As for the index values, the names and values of all index values, and user IDs of one or more users concerned that are used for the determination in the evaluation logic are compiled and created as index value information D444. After the creation, if the evaluation result does not applicable to "Soundness", the teamwork evaluation data E4 is transmitted to the support content determination unit 51 of the support information presentation processing unit 50, and if the evaluation result is applicable to "Sound" ("Yes" in the step ST105), the process ends.

In the present embodiment, the case where the authority gradient of the supervisor to the operator is abnormally high has been described as an example, but as described above, the teamwork evaluation unit 43 can use a different evaluation logic LA to evaluate the teamwork failure in other items. Examples of the items include a low authority gradient, poor user performance due to an inadequate workload, poor user performance due to reduced alertness, excessive reliance on the supervisor or operators, and a dropout from the team due to a lack of responsibility.

On the basis of the teamwork evaluation data E4 output from the teamwork evaluation unit 43, the support information presentation processing unit 50 carries out processing to determine contents of the support, create presentation information, and present the support information to the output device 54 of an appropriate user (steps ST106 to ST107).

The support content determination unit 51 executes a support content determination step ST106 for determining to which user what kind of support is to be provided from the teamwork evaluation data E4 transmitted from the teamwork evaluation unit 43. First, one or more items other than "not applicable" are extracted from the evaluation result information D442 of the teamwork evaluation data E4. For example, in the example of the teamwork evaluation data E4 in FIG. 8, only the item whose team status is "authority gradient: high" is extracted.

Then, the contents of the support, the user to whom the support is provided, and the presentation method are determined.

As shown in FIG. 9, the support content determination unit 51 includes a support content determination table T51 for selecting the support contents, a user to whom the support is provided, and a presentation method. The support content determination table T51 stores support name information D511 indicating the type of the support contents, determination condition information D512, destination user information D513 for an information presentation, presentation method information D514, and data for each item of the support content information D515.

The support name information D511, for example, stores support names such as "authority gradient: high, level 1" and "authority gradient: high, level 2" for distinguishing the support contents. The determination condition information D512 stores conditional expressions (determination conditions) necessary for the determination, such as "authority gradient: high, applicable to level 1" and "authority gradient: high, applicable to level 2". Logical formulas (AND, OR, and the like) in accordance with the team status (team status information D441: FIG. 8) can be stored therein, and even when status for a plurality of teams is involved, the support contents can be described comprehensively.

In the destination user information D513 for the information presentation, one or more user IDs of support targets (destinations for information presentation) to whom the support information is directly presented are described. For example, when the support name is "authority gradient: high, level 1", "User-B" and "User-C" (both operators) are stored in the destination user information D513 for the information presentation. In the present embodiment, the user in the operating team is the destination user for the information presentation, but the user IDs of a worker outside a plant central control room, other operators, or a worker who is a superior to the supervisor may be stored as the destination user for the information presentation.

In the presentation method information D514, one of the types of information presentation methods such as "message display on operation screen" and "voice presentation" is stored as the presentation method. The support content information D515 stores support contents such as advice or recommendation for the problem in the teamwork failure.

The support content determination unit 51 determines one support item applicable to the team status and the evaluation result in the extracted teamwork evaluation data E4 using the support content determination table T51. In a case where the team status extracted in present example is the item of "authority gradient: high" and the evaluation result is the item of "applicable: level 1", the item "authority gradient: high, level 1" is extracted in the support name information D511 of the support content determination table T51. Then, the user to be presented is determined. The information D443 on the user concerned includes "User-A" and "User-B", and since "User-B" coincides with that in the destination user information D513 for the information presentation in the support content determination table T51, the destination user for the information presentation is determined to be User-B. The method described in the presentation method information D514 is adopted for the presentation method.

Then, signal data S51 for instructing generation of the presentation information including the support name, the destination user for the information presentation, the presentation method, and the information on the support contents determined in the manner described above is generated and transmitted to the presentation information generation unit 53. Further, data D51 including time data at which the support content determination process is completed, the support name finally determined, the destination user for the information presentation, the presentation method, and the support contents is accumulated in the support result database 52. At this time, data D44 including the team status, the evaluation result, the user concerned, and the index values in the teamwork evaluation data E4 associated with the support content data is also accumulated in the support result database 52.

The presentation information generation unit 53 carries out processing for creating the presentation data D53 to be transmitted to the output device 54 on the basis of the received signal data S51 and outputting the presentation data D53 to the output device 54 (step ST107). Specifically the presentation data D53 in accordance with the presentation method information D514 is created and output to the output device 54 used by the destination user for the information presentation. FIG. 10 shows an example of outputting the support information having a support name of "authority gradient: high, level 1" on the operation screen G5. Since the destination user for the information presentation is "User-B" and the presentation method is "message display on the operation screen", the message Gm5 described in the support contents is drawn on the operation screen G5 of the operator of User-B.

In this way, the information on the plant and the users is periodically collected, and the support continues to be provided so that operation management can be performed in good teamwork.

Next, updating of the evaluation logic L4 for performing the above-described support will be described. The evaluation logic update processing unit 60 plays a role in changing the evaluation logic L4 for the teamwork evaluation processing unit 40 to evaluate the teamwork status. First, a method for manually changing the evaluation logic L4 will be described.

The evaluation logic update unit 61 visualizes the actual result data of the support result currently registered on the basis of the data D44, the data D51, and the data of the evaluation logic L4 stored in the support result database 52. Then, an editing input by the user such as a selection of the target to be changed, the threshold value for each evaluation item, and a logical formula is accepted, and processing for storing the updated evaluation logic L4 in the evaluation logic database 44 is performed. The user operates the input device 62 such as a mouse or a keyboard. Further, information necessary for the change is output to the output device included in the evaluation logic update unit 61.

FIG. 11 shows a processing flow of the evaluation logic update unit 61. First, the evaluation logic L4 for the target to be changed is selected (step ST611). In order to prompt the user to make a selection, the names of all the evaluation logic L4 registered in the evaluation logic database 44 (for example, "authority gradient: high", "authority gradient: low", etc.) are displayed. At this time, when there is an evaluation result in each of the evaluation logic L4, the data D44 and the data D51 are associated therewith and outputted in a tabular form as reference information when selecting the target to be changed. When a plurality of evaluation results exist in one evaluation logic L4, all the evaluation results are output in order from the latest time data.

When one evaluation logic L4 is selected by a screen operation, an edit screen for editing the selected evaluation logic L4 is output (step ST612). In the present embodiment, an example of changing the threshold value for each of the evaluation items among the changes in the evaluation logic L4 will be described. As shown in FIG. 12, an edit screen G6 is a visualization in the form of a flowchart for the evaluation logic LA of "authority gradient: high" indicated in the title Gt6 and described in FIG. 7. In each of evaluation step display fields Gf6 drawn in the edit screen G6, an editable region Ge6 indicated by a rectangle is arranged, and in the present example, the threshold value of the criterion for the determination currently set is displayed in the editable region Ge6.

When a desired editable region Ge6 is selected via the input device 62, a new threshold value is input, and then the save button Gb6 is pressed, the modified evaluation logic L4 is overwritten on the evaluation logic LA concerned of the evaluation logic database 44 and stored (ST613).

Note that, in addition to the change in the threshold value, changes in the target user in the evaluation step, the index value, the branch condition (Yes/No), the branch destination, the change in the order of the evaluation step, addition of a new evaluation step, and the like may be made. As for the target user and the index value, candidates may be displayed on the screen and selected from the candidates to be changed, or addition and deletion may be newly performed. For example, the evaluation logic L4 may be edited graphically with respect to the branch destination, the order of the evaluation steps, or the addition of a new step. Evaluation step components to be arranged on the edit screen G6 are prepared to set a branch condition, and processing for determining consistency of the logic is performed, so that the evaluation step can be edited.

The evaluation logic update unit 61 may calculate a more suitable value for the threshold value of the evaluation logic LA on the basis of the index values (index value information D444) accumulated in the past and present the calculated value as a candidate near the editable region Ge6. For example, if the index value (duration of problematic emotion) arranged in the evaluation step Gf6 at the uppermost stage in FIG. 12 exceeding the current threshold value (30 seconds) for more than a certain number of times is recorded, the value is presented as a candidate.

In the present embodiment, when the evaluation result of the teamwork evaluation unit 43 is applicable to "Sound" ("Yes" in step ST105), the processing is terminated there, but this is not a limitation. Also in this case, the teamwork evaluation data E4 including the index value calculated by each evaluation logic may be transmitted to the support information presentation processing unit 50, and the support content determination unit 51 may store the data D44 in the support result database 52. Further, a more suitable value including the index value in the case where the evaluation result is "not applicable" may be calculated and set, and a candidate value may be presented.

In addition, in the step ST612, the user is first made to select whether to increase or decrease the number of detections. A more suitable value may be calculated and set with respect to the threshold value which is set to be larger than or smaller than the representative value (for example, an average value) of the accumulated index values by a certain amount, and a candidate value may be presented. Although the above processing shows an example in which a candidate is presented and the user is made to input the threshold value, the user may be made to select whether or not the candidate values are set collectively and the values may be automatically input. Further, although the evaluation logic update unit 61 outputs to present the edited contents, the processing of the steps ST611 to ST613 may be performed on the basis of the setting data that is to be input without the outputting.

Next, a method for automatically changing the evaluation logic L4 will be described. In the present embodiment, the evaluation logic update unit 61 changes the evaluation logic L4 on the basis of the accumulated index values. An example in which the threshold value of the evaluation logic L4 of "authority gradient: high" shown in FIG. 12 is automatically changed, that is, an example in which the steps ST611 to ST613 in FIG. 11 are automatically executed, is shown.

FIG. 13 is a histogram showing accumulated results about the duration of the emotion of the frustration or the stress (problematic emotion) among the index values. If the emotion continues for 10 seconds or more, the data thereof is accumulated, and the data for 20 times in total are accumulated. In the present example, the user specifies a probability of the occurrence frequency of the number of detections using the input device 62 in advance. Assuming that the user has set the probability of the occurrence frequency of the number of detections to 20%, in the data of FIG. 13, the region right to the broken line Th6 on the graph corresponds to 20%; that is, Th6 is the threshold value for four times detections. Therefore, the threshold value for the duration of the problematic emotion is automatically updated to 45 seconds.

In the above example, the method in which the user inputs the probability of the occurrence frequency is described, but this is not a limitation. For example, a method of automatically changing the evaluation logic L4 by using machine learning, such as learning a pattern of data by using the Mahalanobis distance and setting data of an anomalous value which deviates significantly from the data as a threshold value, may be used.

Note that, conventionally, in the case of learning using training data or learning by increasing or decreasing a reward according to a rule every time data is accumulated, accumulation of the training data or good examples is required for the evaluation. Furthermore, the evaluation criteria obtained from the learning results are also a black box, and it was not possible to know what the criteria are. Therefore, in order to update the evaluation method tailored to actual conditions, it is necessary to have new training data or to accumulate good examples, and thus it is difficult to update the evaluation criteria.

In contrast, in the plant operation support apparatus 10 and the plant operation support method according to the present embodiment, the teamwork is evaluated by using the evaluation logic IA constructed by combining the evaluation steps for quantitatively determining whether "Yes" or "No". That is, the evaluation is performed by using the evaluation logic L4 in which the plurality of logical formulas for evaluating a numerical value with respect to a threshold value and outputting whether it is applicable or not are combined. Therefore, the evaluation logic L4 can be easily updated according to the actual conditions as described above without accumulating correct data or good examples, whether manually or automatically.

Note that, although various exemplary embodiments and examples are described in the present application, various features, aspects, and functions described in the embodiments are not limited to the illustrated examples and can be applicable alone or in their various combinations. Accordingly, countless variations that are not illustrated are envisaged within the scope of the art disclosed herein. For example, the case where at least one component is modified, added or omitted, and the case where at least one component is extracted and combined with other components are included.

For example, in the present embodiment, an example has been described in which, when the evaluation result of the teamwork evaluation unit 43 corresponds to "Sound", the processing ends. However, even in this case, the presentation information generation unit 53 may create a message indicating that the team status is sound and output the message to the output device 54. Further, although the method for determining one of the support contents by the support content determination unit 51 has been described, the present invention is not limited to this. The support content determination table T51 is not such that the support contents can be comprehensively narrowed down to one but is made compatible with a plurality of determination conditions, and a plurality of the support contents may be determined and presentation information may be created using data in which a priority order is defined and may be sequentially presented to the output device 54.

Furthermore, as an example, in order to understand the mental status (type of emotion) of the user, a waveform of the biological data is used, but this is not a limitation. For example, when a combination of words appearing during a conversation matches a certain emotion, it may be determined that the person is in the emotion state, and the time during which the emotion continues may be estimated from the time during which the pattern of biological data such as the heart rate and the brain wave continues at the time when the determination is made.

As described above, the plant operation support apparatus 10 according to Embodiment 1 comprises the output device 54 to be provided in correspondence with each of the plurality of members (users) constituting a team and to present information for performing plant operation as the team, the index value calculation unit 41 (including the index prediction value calculation unit 42) to calculate, with respect to the plurality of evaluation items for evaluating any of the status of each of the plurality of members (users), communication status between the members (users), and workload status of each of the plurality of members (users), the index value (the index data D41, the index prediction values P42) obtained by quantifying a degree of the status for each of the evaluation items, the teamwork evaluation unit 43 to evaluate a teamwork of the team based on the index value, the support content determination unit 51 to select the target persons to be supported including the members (users) of the team based on the evaluation result of the teamwork (the teamwork evaluation data E4) and determine support contents in accordance with the target persons to be supported, and the presentation information generation unit 53 to generate the presentation information (the presentation data D53) for presenting the determined support contents for each of the output devices 54 corresponding to the selected target persons to be supported among the output devices 54, wherein the teamwork evaluation unit 43 evaluates the teamwork using the evaluation logic L4 configured by combining the logical formulas for comparing the threshold value set for each of the plurality of evaluation items with the calculated index value, so that the teamwork can be evaluated and the plant operation can be appropriately supported without preparing predetermined correct data.

When the index value calculation unit 41 calculates, as the index value, the measurement result (for example, the time when the emotion that is problematic for the teamwork continues) of biological data related to emotion of each of the plurality of members (users), it is possible to quantitatively evaluate whether or not the mental status is not good for the teamwork (the user has a problematic emotion), that is, the mental status of the user, and incorporate the result into the logical formulas of the evaluation logic L4 described above.

When the index value calculation unit 41 calculates, as the index value, any of the volume of voice, the interval between utterances, and the tone of voice in a conversation between the members (users), the communication status between the users can be quantitatively evaluated and incorporated into the logical formulas of the evaluation logic L4 described above.

Since the evaluation logic update unit 61 for modifying either the threshold value or the relationship in the combining is provided, the evaluation logic IA can be easily modified even if there is no training data or correct data, and an appropriate teamwork evaluation suited to the actual situation can be performed.

When the evaluation logic update unit 61 automatically updates the threshold value by using a statistical analysis method such as the probability of the occurrence frequency of an event or the Mahalanobis distance for the evaluation item for which an anomalous value is set as the threshold value among the evaluation items, the evaluation logic L4 is automatically updated by using data obtained in the actual plant operation, and an appropriate teamwork evaluation suited to the actual situation can be performed.

Further, as described above, the plant operation support method according to Embodiment 1 includes the index value calculation step (step ST103) for calculating, with respect to the plurality of evaluation items for evaluating any of the status of each of the plurality of members (users) who perform plant operation as a team, the communication status between the members (users), and the workload status of each of the plurality of members (users), the index value (index data D41, index prediction values P42) obtained by quantifying a degree of the status for each of the evaluation items, the teamwork evaluation step (step ST104) for evaluating the teamwork of the team based on the calculated index value, the support content determination step (step ST106) for selecting target persons to be supported including the members (users) of the team based on the evaluation result of the teamwork (the teamwork evaluation data E4) and determining support contents in accordance with the target persons to be supported, and the support content presentation step (step ST107) for presenting the determined support contents for each of the selected target persons to be supported, wherein, in the teamwork evaluation step, the teamwork is evaluated using the evaluation logic L4 configured by combining logical formulas for comparing the threshold value set for each of the plurality of evaluation items with the calculated index value, so that the teamwork can be evaluated and the plant operation can be appropriately supported without preparing predetermined correct data.

When the evaluation logic update step (step ST612) for modifying either the threshold value or the relationship in the combining is included, the evaluation logic L4 can be easily modified even if there is no training data or correct data, and an appropriate teamwork evaluation suited to the actual situation can be performed.

DESCRIPTION OF REFERENCE NUMERALS AND SIGNS

10: plant operation support apparatus, 20: plant status determination processing unit, 30: user information collection processing unit, 40: teamwork evaluation processing unit, 41: index value calculation unit, 42: index prediction value calculation unit, 43: teamwork evaluation unit, 50: support information presentation processing unit, 51: support content determination unit, 53: presentation information generation unit, 54: output device, 60: evaluation logic update processing unit, 61: evaluation logic update unit, D41: index data (index value), D53: presentation data, E4: teamwork evaluation data, L4: evaluation logic, P42: index prediction value (index value)

The invention claimed is:

1. A plant operation support method that is performed by a plant operation support apparatus, the method comprising:
an index value calculation step of calculating, with respect to a plurality of evaluation items including a level of an authority gradient between an operator and a supervisor who instructs the operator on work contents and any of status of each of the plurality of members who perform plant operation as a team including the operator and the supervisor, communication status between the members, and workload status of each of the plurality of members, an index value obtained by quantifying a degree of the status for each of the evaluation items;

a teamwork evaluation step of evaluating a teamwork of the team based on the plurality of index values;

a support content determination step of selecting target persons to be supported including the members of the team based on the evaluation result of the teamwork and determining support contents in accordance with the target persons to be supported; and a support content presentation step of presenting the determined support contents for each of the selected target persons to be supported, wherein, for the level of the authority gradient, any of the number of times of utterances in a strong imperative tone of voice from the supervisor to the operator, duration of problematic emotion of the operator, a volume of voice of the operator, and an interval between utterances in a conversation are used as the index values, in a case where the status of each of the plurality of members is used for the evaluation items, any of a volume of voice, an utterance speed, a choice of words, a tone of voice, and duration of particular emotion are used as the index values, in a case where the communication status between the members is used for the evaluation items, any of a degree of matching in conversation patterns and an interval between conversations, in the conversations between the members, are used as the index values, in a case where the workload status of each of the plurality of members is used for the evaluation items, any of an increase and/or decrease in a work actual result time with respect to a standard work time, and the number of work steps executed simultaneously in parallel are used as the index values, and in the teamwork evaluation step, the teamwork is evaluated using an evaluation logic configured by combining logical formulas for comparing a threshold value set for each of the plurality of evaluation items with the calculated index value.

2. The plant operation support method according to claim 1, further comprising an evaluation logic update step of modifying either the threshold value or relationship in the combining.

3. A plant operation support apparatus comprising:

an output device to be provided in correspondence with each of a plurality of members constituting a team including an operator and a supervisor who instructs the operator on work contents, and to present information for performing plant operation as the team;

an index value calculator to calculate, with respect to a plurality of evaluation items including a level of an authority gradient between the operator and the supervisor and any of status of each of the plurality of members, communication status between the members, and workload status of each of the plurality of members, an index value obtained by quantifying a degree of the status for each of the evaluation items;

a teamwork evaluator to evaluate a teamwork of the team based on the plurality of index values;

a support content determiner to select target persons to be supported including the members of the team based on the evaluation result of the teamwork and determine support contents in accordance with the target persons to be supported; and a presentation information generator to generate presentation information for presenting the determined support contents for each of the output devices corresponding to the selected target persons to be supported among the output devices, wherein, for the level of the authority gradient, any of the number of times of utterances in a strong imperative tone of voice from the supervisor to the operator, duration of problematic emotion of the operator, a volume of voice of the operator, and an interval between utterances in a conversation are used as the index values, in a case where the status of each of the plurality of members is used for the evaluation items, any of a volume of voice, an utterance speed, a choice of words, a tone of voice, and duration of particular emotion are used as the index values, in a case where the communication status between the members is used for the evaluation items, any of a degree of matching in conversation patterns and an interval between conversations, in the conversations between the members, are used as the index values, in a case where the workload status of each of the plurality of members is used for the evaluation items, any of an increase and/or decrease in a work actual result time with respect to a standard work time, and the number of work steps executed simultaneously in parallel are used as the index values, and the teamwork evaluator evaluates the teamwork using an evaluation logic configured by combining logical formulas for comparing a threshold value set for each of the plurality of evaluation items with the calculated index value.

4. The plant operation support apparatus according to claim 3, wherein, in a case where any of the problematic emotion and the particular emotion of each of the plurality of members are used for the evaluation items, the index value calculator calculates, as the index value, a measurement result of biological data related thereto.

5. The plant operation support apparatus according to claim 3, wherein, in a case where any of the number of times of the strong imperative tone of voice, the tone of voice, and the degree of matching in conversation patterns are used for the evaluation items, the index value calculator calculates the index value from a result obtained by converting voice recognition into a text.

6. The plant operation support apparatus according to claim 4, wherein, in a case where any of the number of times of the strong imperative tone of voice, the tone of voice, and the degree of matching in conversation patterns are used for the evaluation items, the index value calculator calculates the index value from a result obtained by converting voice recognition into a text.

7. The plant operation support apparatus according to claim 3, further comprising an evaluation logic updater to modify either the threshold value or relationship in the combining.

8. The plant operation support apparatus according to claim 4, further comprising an evaluation logic updater to modify either the threshold value or relationship in the combining.

9. The plant operation support apparatus according to claim 5, further comprising an evaluation logic updater to modify either the threshold value or relationship in the combining.

10. The plant operation support apparatus according to claim 6, further comprising an evaluation logic updater to modify either the threshold value or relationship in the combining.

11. The plant operation support apparatus according to claim 7, wherein the evaluation logic updater automatically updates the threshold value by using a statistical analysis method for an evaluation item for which an anomalous value is set as the threshold value among the evaluation items.

12. The plant operation support apparatus according to claim 8, wherein the evaluation logic updater automatically updates the threshold value by using a statistical analysis method for an evaluation item for which an anomalous value is set as the threshold value among the evaluation items.

13. The plant operation support apparatus according to claim 9, wherein the evaluation logic updater automatically updates the threshold value by using a statistical analysis method for an evaluation item for which an anomalous value is set as the threshold value among the evaluation items.

14. The plant operation support apparatus according to claim 10, wherein the evaluation logic updater automatically updates the threshold value by using a statistical analysis method for an evaluation item for which an anomalous value is set as the threshold value among the evaluation items.

* * * * *